March 30, 1965   S. J. HEIN ETAL   3,175,630
AUGER BIT
Filed Nov. 13, 1961

INVENTORS
SIMON J. HEIN
MARTIN B. HEIN
BY John H. Williamson
ATTORNEY

United States Patent Office 3,175,630
Patented Mar. 30, 1965

3,175,630
AUGER BIT
Simon J. Hein and Martin B. Hein, both of
937 S. Wichita, Wichita, Kans.
Filed Nov. 13, 1961, Ser. No. 151,602
4 Claims. (Cl. 175—386)

This invention relates to drilling. In a more specific aspect this invention relates to augers. More specifically this invention relates to auger bits. Still more specifically this invention relates to a new type of removable auger bit, whose cutting edges extend beyond the edges of the flights of the auger and whose leading cutting edges are of a new and very advantageous configuration.

Various types and shapes of auger bits are known to the prior art. However, heretofore, none of these auger bits have been able to solve the problem of binding of the edges of the flights of the auger without themselves greatly increasing the amount of power necessary to turn the auger.

The new auger bit means of our invention is a cutting piece having a curved cutting edge. It is mountable on a cuttings means to work therewith. And, it is most preferably and advantageously of size to, when mounted, extend beyond the operable extent of the cuttings removal means. The new auger bit means of our invention are mounted on the lower extremities of the flights of an auger to provide the new auger means of our invention.

Our new invention solves these difficulties of the auger bits of the prior art by being fashioned into a novel shape. The cutting edge is preferably tapered so that no great increase in power is necessary to turn an auger equipped with our new auger bit. The outermost portion of the cutting edge preferably extends beyond the edges of the flights of the auger, thus cutting a slightly larger hole than would be necessary to allow the flights of the auger to pass through, thus greatly reducing the binding of the augers against the walls of the formed hole.

It is an object of this invention to provide an improved drilling means, especially drilling means for forming a hole in the earth.

It is another object of this invention to provide novel auger bit means.

Another object of this invention is to provide new auger means.

It is still another object of this invention to provide an auger bit and an auger which decreases the tendency of the flights of the auger to bind against the walls of the formed hole while not substantially increasing the amount of power necessary to drive the auger.

It is yet another object of this invention to overcome the various disadvantages of the auger bits of the prior art.

Other objects and advantages of the new auger bit of our invention will be obvious or will become apparent to those skilled in the art upon reading this disclosure.

Drawings accompany and are a part of this disclosure. These drawings depict preferred specific embodiments of the new auger bit structure of our invention, and it is to be understood that such drawings are not to unduly limit the scope of our invention.

Figure 1:
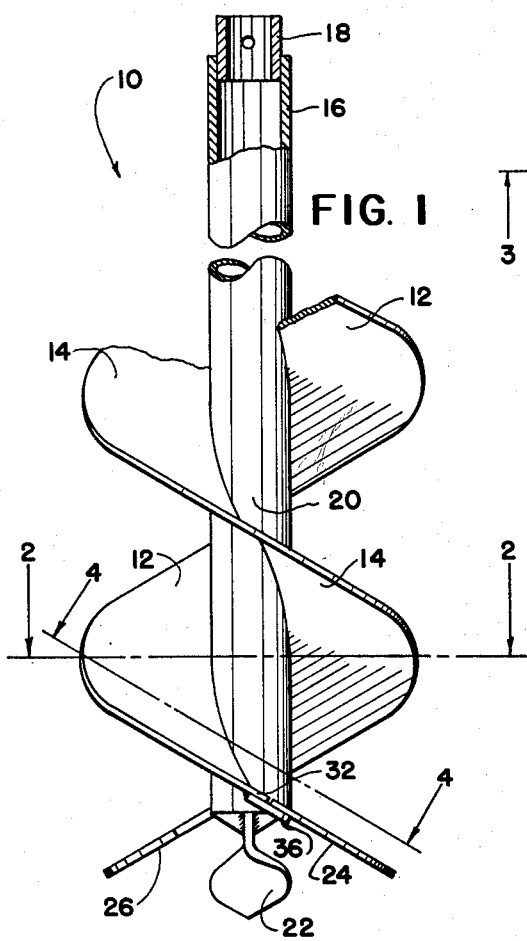
FIG. 1 is a longitudinal elevation view of a preferred specific embodiment of the new hole drilling means of our invention showing the new auger bit mounted on an anger.

Following is a discussion and description of the new auger bit structure of our invention, made with reference to the drawings whereon the same reference numerals are used to indicate the same or similar parts and/or structure. The discussion and description are of preferred specific embodiments of the new auger bit structure of our invention, and it is to be understood that such is not to unduly limit the scope of our invention.

Figure 2:
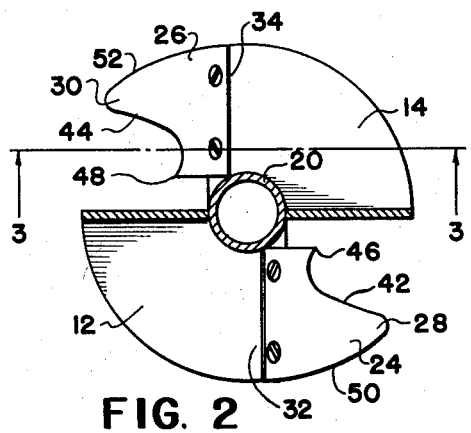
FIG. 2 is a cross sectional plan view of the preferred specific embodiment of the new auger bit of our invention mounted on the auger, taken along the line 2—2 of FIG. 1.
Figure 3:
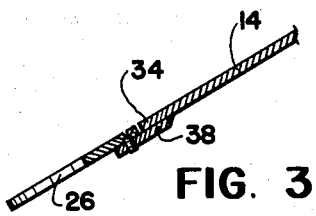
FIG. 3 is a cross sectional view, taken along the line 3—3 of FIG. 2.
Figure 4:
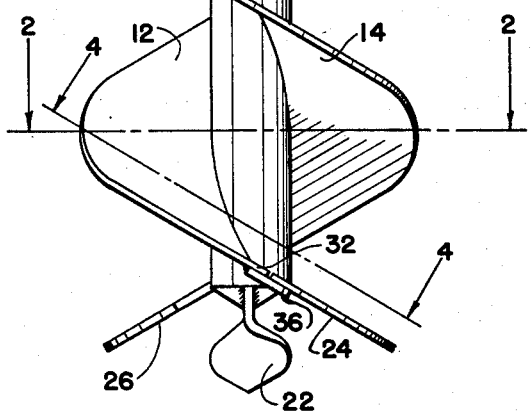
FIG. 4 is a cross sectional perspective view taken along the line 4—4 of FIG. 1.
Figure 5:
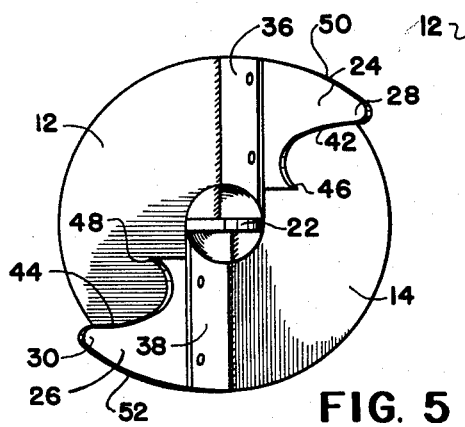
FIG. 5 is a bottom plan view of the auger of FIG. 1.

Referring now to the drawings, FIGS. 1 through 5, 10 is a common auger, having two flights, primary flight 12 and secondary flight 14, a stem 16, a socket 18 to receive any common and suitable powering means (not shown) such as an electric motor with or without gearing, a gasoline engine with or without gearing, hand turning means, and the like, and a shaft 20, at the end of which is a lead screw 22.

The new auger and auger bit of our invention preferably consists of a series of cutting bit pieces on blades 24 and 26, and in our most preferred embodiment shaped, constructed and mounted on the auger flights as shown in the drawings. They each have a cutting edge or lip 28 and 30, respectively, which preferably extends beyond the projection of the edges of the flights of the auger. The cutting bit pieces 24 and 26 are mounted in any suitable manner at terminations 32 and 34 of flights 12 and 14, respectively, preferably by means of mounting plates 36 and 38, respectively, which in turn are suitably mounted, preferably by welding on the terminations 32 and 34. Each mounting plate preferably has spaced threaded holes thereon. Bolt means as shown are desirably employed to mount cutting bit pieces 24 and 26 on plates 36 and 38, respectively. This provides for easy replacement or removal for sharpening. Cutting bit pieces 24 and 26 very desirably have tapered cutting edges 42 and 44, points 46 and 48, and tapered outer edges 50 and 52, respectively, which preferably join flush and smooth with the edge of the flights. The cutting edges 28 and 30 are preferably rounded, continuing arcuately toward the axis of shaft 20, first curving back sharply, then curving back less sharply, then curving forward preferably slightly to form cutting points 46 and 48, and then straight back to the junction between the cutting bit pieces and the flights 12 and 14. The outward edges 50 and 52 of the cutting bit pieces 24 and 26, respectively, are preferably arcuate, curving slightly inward to meet the flights 12 and 14, respectively, at the outermost extremities thereof.

Our new auger bit is preferably used as follows. Cutting bit pieces 24 and 26 are bolted to mounting plates 36 and 38 or otherwise suitably securely fastened to flights 12 and 14. Any suitable means of providing torque to the auger 10 is attached at socket 18. The auger 10 is then turned and forced into material, such as the ground, and the like. The cutting bit pieces 24 and 26 of my invention cut the hole, which will be slightly larger than the diameter of the flights. An easy and efficient cutting and slicing action results from the new bit shape, structure and mounting of our invention, the leading cutting edges 46 and 48 making for almost powerless and frictionless bit progress. The flights act to remove the cuttings from the hole. Because of the larger hole cut by the bits, there is no binding between the surface of the hole and the edges of the flights. The power of the torque-providing means is utilized entirely in forming the hole, rather than in overcoming friction. Also the auger is easier to guide and control. My new invention greatly simplifies the difficulties involved in drilling holes. It has proven very successful in use as a portable auger to drill holes, such as fence post holes, being easily powered therefore by a common small electric drill motor.

As will be obvious to those skilled in the art, various modifications of the auger bit structure of our invention disclosed herein can be made or followed without departing from the spirit of the disclosure or from the scope of the claims.

We claim:

1. An auger comprising, a shaft, a primary and a secondary flight on said shaft, mounting plates having spaced mounting holes therein and welded to the lower straight terminations of said primary and secondary flights with the forward edges of the mounting plates parallel to said flight terminations, said terminations being edges perpendicular to the longitudinal axis of said auger, two identical flat metal bit pieces having spaced holes therethrough in a rearward portion and oppositely mounted one on each of said mounting plates by bolt means through said holes in said bit pieces and mounting plates and in contact with said flights, said pieces extending slightly beyond the outer radial edges of said flights, each of said pieces having sharp forward cutting edges beginning at a rounded point at the most outward portion of same and continuing arcuately toward said axis of said auger first curving back sharply, then curving back less sharply, then curving slightly forward to form a sharp forward point and then straight back to the junction between said bit piece and the flight, the outward edges of each of said bit pieces being arcuate and curving from said rounded points slightly inward and meeting the flight at the outermost extremity thereof, and a lead screw on the lower end of said shaft.

2. An auger comprising, a shaft, flights on said shaft having outer terminations perpendicular to the longitudinal axis of said auger, flat bit pieces oppositely mounted one on each of said flights, said pieces provided with extended portions that extend slightly beyond the outer radial edges of said flights, each of said pieces having generally concave arcuate cutting edges and an inner sharp leading point, each of said generally concave arcuate cutting edges extending from said inner sharp leading point outwardly over the major portion of the radial distance of said bit pieces, each of said pieces having an outside arcuate edge curving from the extended portion inward and meeting the flight in an outer extremity thereof, and a lead screw on the lower end of said shaft.

3. In an auger having a shaft, a primary and a secondary flight on said shaft having outer straight terminations perpendicular to the longitudinal axis of said auger, and a lead screw on the lower end of said shaft, that improvement comprising, mounting plates having spaced mounting holes therein welded to said flights at said terminations thereof to provide a leading edge parallel to said terminations, two identical flat metal bit pieces having spaced holes therethrough in a rearward portion and oppositely mountable one on each of said mounting plates by bolt means through said holes in said bit pieces and mounting plates and in contact with said flights, said pieces extending slightly beyond the outer radial edges of said flights, each of said pieces having sharp forward cutting edges beginning at a rounded point at the most outward portion of same and continuing arcuately toward said axis of said auger first curving back sharply then curving back less sharply, then curving slightly forward to form a sharp forward point, and then straight back to the junction between said bit piece and the flight, the outward edges of each of said bit pieces being arcuate and curving from said rounded points slightly inward and meeting the flight at the outermost extremity thereof when mounted thereon.

4. A flat metal bit having spaced holes therethrough and removably mountable on an auger flight at its outer extremity, said bit of size to extend slightly beyond the outer radial edge of an auger flight when mounted thereon, having a sharp forward curved cutting edge beginning at a rounded point at the most outward portion of same and continuing arcuately toward the axis of an auger, when mounted, then curving slightly forward to form a sharp forward point and then straight back to the junction between said bit piece and the flight when mounted, the outward edge of said bit being arcuate and curving from said rounded point slightly inward and meeting said flight, when mounted, at the outer extremity thereof.

References Cited in the file of this patent
UNITED STATES PATENTS

| | | |
|---|---|---|
| 185,638 | Hubbard | Dec. 26, 1876 |
| 469,307 | Smith | Feb. 23, 1892 |
| 505,456 | Gibbs | Sept. 26, 1893 |
| 893,950 | Thomas | July 21, 1908 |
| 1,479,668 | Lyle | Jan. 1, 1924 |
| 1,789,399 | Bartenbach et al. | Jan. 20, 1931 |
| 2,107,958 | Pribyl | Feb. 8, 1938 |
| 2,320,610 | Kandle | June 1, 1943 |
| 2,634,104 | Clayton et al. | Apr. 7, 1953 |
| 2,694,552 | Vadnais | Nov. 16, 1954 |
| 2,709,573 | Reed | May 31, 1955 |
| 2,846,192 | Ostling | Aug. 5, 1958 |